US012592185B2

(12) United States Patent
Kim et al.

(10) Patent No.: US 12,592,185 B2
(45) Date of Patent: Mar. 31, 2026

(54) DISPLAY DEVICE AND ELECTRONIC DEVICE INCLUDING THE SAME

(71) Applicant: Samsung Display Co., Ltd., Yongin-si (KR)

(72) Inventors: Myeongeon Kim, Yongin-si (KR); Wonkyu Kwak, Yongin-si (KR); Jongseok Kim, Yongin-si (KR); Young-Soo Yoon, Yongin-si (KR); Kwangsae Lee, Yongin-si (KR); Dong Eup Lee, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 19/088,435

(22) Filed: Mar. 24, 2025

(65) Prior Publication Data

US 2025/0336339 A1 Oct. 30, 2025

(30) Foreign Application Priority Data

Apr. 29, 2024 (KR) ........................ 10-2024-0057142

(51) Int. Cl.
*G09G 3/32* (2016.01)

(52) U.S. Cl.
CPC ....... *G09G 3/32* (2013.01); *G09G 2300/0426* (2013.01); *G09G 2300/0819* (2013.01); *G09G 2300/0842* (2013.01); *G09G 2310/0297* (2013.01); *G09G 2330/021* (2013.01)

(58) Field of Classification Search
CPC ............. G09G 3/32; G09G 2300/0426; G09G 2300/0819; G09G 2300/0842; G09G 2310/0297; G09G 2330/021
See application file for complete search history.

(56) References Cited

U.S. PATENT DOCUMENTS

2023/0368739 A1* 11/2023 Yin ..................... G09G 3/3233

FOREIGN PATENT DOCUMENTS

| | | | |
|---|---|---|---|
| KR | 10-1174884 | B1 | 8/2012 |
| KR | 10-2024-0051015 | A | 4/2024 |
| KR | 10-2024-0126475 | A | 8/2024 |
| KR | 10-2024-0144666 | A | 10/2024 |

* cited by examiner

*Primary Examiner* — Michael A Faragalla
(74) *Attorney, Agent, or Firm* — Womble Bond Dickinson (US) LLP

(57) ABSTRACT

A display device includes: a display panel including a first pixel circuit portion to drive a first light emitting diode to emit a first color; a second pixel circuit portion to drive a second light emitting diode to emit the first color; a third pixel circuit portion to drive a third light emitting diode to emit a second color; a fourth pixel circuit portion to drive a fourth light emitting diode to emit a third color; a fifth pixel circuit portion to drive a fifth light emitting diode to emit the first color; a sixth pixel circuit portion to drive a sixth light emitting diode to emit the first color; a seventh pixel circuit portion to drive a seventh light emitting diode to emit the second color; and an eighth pixel circuit portion to drive an eighth light emitting diode to emit the third color.

14 Claims, 9 Drawing Sheets

DISPLAY DEVICE AND ELECTRONIC DEVICE INCLUDING THE SAME

CROSS-REFERENCE TO RELATED APPLICATION

The present application claims priority to and the benefit of Korean Patent Application No. 10-2024-0057142, filed on Apr. 29, 2024, in the Korean Intellectual Property Office, the entire disclosure of which is incorporated by reference herein.

BACKGROUND

1. Field

Aspects of embodiments of the present disclosure relate to a display device that provides visual information and an electronic device including the same.

2. Description of the Related Art

When increasing a resolution of a display device, a number of data lines increases and a number of data drivers increases. As such, manufacturing costs may be increased. Therefore, a method may be used to reduce a number of data drivers by dividing the data signal input from the data driver, and sequentially applying them to the data lines using demultiplexers that select one of the plurality of outputs and connect the input.

The above information disclosed in this Background section is for enhancement of understanding of the background of the present disclosure, and therefore, it may contain information that does not constitute prior art.

SUMMARY

A display device including demultiplexers may have a structure in which two data lines are alternately connected to a row of pixels. In this case, the two data lines may be disposed to be adjacent to each other between two rows of pixels. Further, a coupling may occur between two adjacent data lines, causing the data voltage stored in the data lines to fluctuate. As a result, an image quality may be degraded or distorted.

One or more embodiments of the present disclosure may be direct to a display device having an improved display quality.

According to one or more embodiments of the present disclosure, a display device includes: a display panel including first, second, third, and fourth data lines, each extending in a first direction, and spaced from each other along a second direction crossing the first direction; and a data driver adjacent to the display panel in the first direction, and including first, second, and third amplifiers. The display panel further includes: a first pixel circuit portion in a first pixel circuit area, connected to the first data line connected to the first amplifier, and configured to drive a first light emitting diode configured to emit a first color; a second pixel circuit portion in a second pixel circuit area spaced from the first pixel circuit area in the second direction, connected to the second data line connected to the second amplifier, and configured to drive a second light emitting diode configured to emit the first color; a third pixel circuit portion in a third pixel circuit area spaced from the second pixel circuit area in the second direction, connected to the third data line connected to the second amplifier, and configured to drive a third light emitting diode configured to emit a second color; a fourth pixel circuit portion in a fourth pixel circuit area spaced from the third pixel circuit area in the second direction, connected to the fourth data line connected to the third amplifier, and configured to drive a fourth light emitting diode configured to emit a third color; a fifth pixel circuit portion in a fifth pixel circuit area spaced from the first pixel circuit area in the first direction, connected to the first data line connected to the first amplifier, and configured to drive a fifth light emitting diode configured to emit the first color; a sixth pixel circuit portion in a sixth pixel circuit area spaced from the second pixel circuit area in the first direction, connected to the second data line connected to the second amplifier, and configured to drive a sixth light emitting diode configured to emit the first color; a seventh pixel circuit portion in a seventh pixel circuit area spaced from the third pixel circuit area in the first direction, connected to the third data line connected to the second amplifier, and configured to drive a seventh light emitting diode configured to emit the second color; and an eighth pixel circuit portion in an eighth pixel circuit area spaced from the fourth pixel circuit area in the first direction, connected to the fourth data line connected to the third amplifier, and configured to drive an eighth light emitting diode configured to emit the third color.

In an embodiment, the first light emitting diode may overlap with at least a portion of the first pixel circuit area in a plan view, and the second light emitting diode may overlap with at least a portion of the third pixel circuit area in a plan view.

In an embodiment, the fifth light emitting diode may overlap with at least a portion of the fifth pixel circuit area in a plan view, and the sixth light emitting diode may overlap with at least a portion of the seventh pixel circuit area in a plan view.

In an embodiment, the first color may be a green color, the second color may be a blue color, and the third color may be a red color.

In an embodiment, the first color may be a green color, the second color may be a red color, and the third color may be a blue color.

In an embodiment, no pixel circuit portion may be located between the first data line and the second data line in a plan view, and at least one pixel circuit portion from among the first to eighth pixel circuit portions may be located between the second data line and the third data line.

In an embodiment, the first data line and the second data line may be spaced from each other by a first length in the second direction, and the second data line and the third data line may be spaced from each other by a second length greater than the first length in the second direction.

In an embodiment, each of the first, second, third, fourth, fifth, sixth, seventh, and eighth light emitting diodes may have a diamond shape in a plan view.

In an embodiment, the display device may further include: demultiplexers between the display panel and the data driver; and a demultiplexer controller configured to drive the demultiplexers.

In an embodiment, the demultiplexers may include first, second, and third demultiplexers, the first demultiplexer may be electrically connected to the first data line, the second demultiplexer may be electrically connected to the second data line and the third data line, and the third demultiplexer may be electrically connected to the fourth data line.

In an embodiment, the display device may further include a first clock signal line and a second clock signal line connected to the demultiplexer controller, and extending in the second direction.

In an embodiment, the first clock signal line may be electrically connected to the first data line and the second data line, and the second clock signal line may be electrically connected to the third data line and the fourth data line.

In an embodiment, the second amplifier may be configured to alternately transmit data signals to the second data line and the third data line through the first clock signal line and the second clock signal line.

According to one or more embodiments of the present disclosure, a display device includes: a display panel including data lines extending in a first direction, and spaced from each other along a second direction crossing the first direction; a data driver spaced from the display panel in the first direction; demultiplexers between the display panel and the data driver; a demultiplexer controller configured to control the demultiplexers; and a first clock signal line and a second clock signal line connected to the demultiplexer controller and the demultiplexers, and extending in a second direction crossing the first direction. The display panel includes: a first data line from among the data lines, electrically connected to the first clock signal line, and electrically connected to light emitting diodes configured to emit a first color; a second data line adjacent to the first data line in the second direction from among the data lines, electrically connected to the first clock signal line, and electrically connected to light emitting diodes configured to emit the first color; a third data line spaced from the second data line in the second direction from among the data lines, electrically connected to the second clock signal line, and electrically connected to light emitting diodes configured to emit a second color; and a fourth data line adjacent to the second data line in the second direction from among the data lines, electrically connected to the second clock signal line, and electrically connected to light emitting diodes configured to emit a third color.

In an embodiment, the first data line and the second data line may be spaced from each other by a first length in the second direction, and the second data line and the third data line may be spaced from each other by a second length greater than the first length in the second direction.

In an embodiment, no pixel circuit portion may be located between the first data line and the second data line, and at least one pixel circuit portion may be located between the second data line and the third data line.

In an embodiment, the first color may be a green color, the second color may be a red color, and the third color may be a blue color.

In an embodiment, the first color may be a green color, the second color may be a blue color, and the third color may be a red color.

In an embodiment, the data driver may include a first amplifier, a second amplifier, and a third amplifier along the second direction.

In an embodiment, the second amplifier may be connected to the second data line and the third data line.

According to one or more embodiments of the present disclosure, an electronic device includes: a display device and a processor that drives the display device. The display device includes a display panel comprising first, second, third, and fourth data lines, each extending in a first direction, and spaced from each other along a second direction crossing the first direction and a data driver adjacent to the display panel in the first direction, and comprising first, second, and third amplifiers, wherein the display panel further comprises, a first pixel circuit portion in a first pixel circuit area, connected to the first data line connected to the first amplifier, and configured to drive a first light emitting diode configured to emit a first color, a second pixel circuit portion in a second pixel circuit area spaced from the first pixel circuit area in the second direction, connected to the second data line connected to the second amplifier, and configured to drive a second light emitting diode configured to emit the first color, a third pixel circuit portion in a third pixel circuit area spaced from the second pixel circuit area in the second direction, connected to the third data line connected to the second amplifier, and configured to drive a third light emitting diode configured to emit a second color, a fourth pixel circuit portion in a fourth pixel circuit area spaced from the third pixel circuit area in the second direction, connected to the fourth data line connected to the third amplifier, and configured to drive a fourth light emitting diode configured to emit a third color, a fifth pixel circuit portion in a fifth pixel circuit area spaced from the first pixel circuit area in the first direction, connected to the first data line connected to the first amplifier, and configured to drive a fifth light emitting diode configured to emit the first color, a sixth pixel circuit portion in a sixth pixel circuit area spaced from the second pixel circuit area in the first direction, connected to the second data line connected to the second amplifier, and configured to drive a sixth light emitting diode configured to emit the first color, a seventh pixel circuit portion in a seventh pixel circuit area spaced from the third pixel circuit area in the first direction, connected to the third data line connected to the second amplifier, and configured to drive a seventh light emitting diode configured to emit the second color, and an eighth pixel circuit portion in an eighth pixel circuit area spaced from the fourth pixel circuit area in the first direction, connected to the fourth data line connected to the third amplifier, and configured to drive an eighth light emitting diode configured to emit the third color.

According to some embodiments of the present disclosure, a display device may include a display panel including first, second, third, and fourth data lines that extend in a first direction and are spaced apart from each other in a second direction crossing or intersecting the first direction, and a data driver disposed adjacent to the display panel in the first direction and including first, second, and third amplifiers. The display panel may include a first pixel circuit portion connected to the first data line connected to the first amplifier, disposed in a first pixel circuit area, and that drives a first light emitting diode that emits a first color, a second pixel circuit portion connected to the second data line connected to the second amplifier, disposed in a second pixel circuit area spaced apart from the first pixel circuit area in the second direction, and that drives a second light emitting diode that emit the first color, a third pixel circuit portion connected to the third data line connected to the second amplifier, disposed in a third pixel circuit area spaced apart from the second pixel circuit area in the second direction, and that drives a third light emitting diode that emit a second color, a fourth pixel circuit portion connected to the fourth data line connected to the third amplifier, disposed in a fourth pixel circuit area spaced apart from the third pixel circuit area in the second direction, and that drives a fourth light emitting diode that emit a third color, a fifth pixel circuit portion connected to the first data line connected to the first amplifier, disposed in a fifth pixel circuit area spaced apart from the first pixel circuit area in the first direction, and that drives a fifth light emitting diode that emit the first color, a sixth pixel circuit portion connected to the second data line connected to the second amplifier, disposed in a sixth pixel circuit area spaced apart from the second pixel circuit area in the first direction, and that drives a sixth light emitting diode that emit the first color, a seventh pixel circuit portion connected to the third data line connected to the second amplifier, disposed in a seventh pixel circuit area spaced apart from the third pixel circuit area in the first direction, and that drives a seventh light emitting diode that emit the second color and an eighth pixel circuit portion connected to the fourth data line connected to the third amplifier, disposed in an eighth pixel circuit area spaced apart from the fourth pixel circuit area in the first direction, and that drives an eighth light emitting diode that emit the third color.

According to some embodiments of the present disclosure, as the first light emitting diode and the fifth light emitting diode emitting light of the first color are concurrently or simultaneously connected to the first data line, a power consumption of the first amplifier that controls the first data line may be reduced. In other words, compared to a case where the first amplifier applies two or more color signals to the first data line, when the first amplifier controls one color signal, the power consumption of the first amplifier may be reduced. Similarly, as the second light emitting diode and the sixth light emitting diode emitting the second color are concurrently or simultaneously connected to the second data line, a power consumption of the second amplifier that controls the second data line may be reduced.

According to some embodiments, as the first data line and the second data line control the same first color, a data coupling between the first data line and the second data line may be reduced. In other words, the data coupling between the data lines may be reduced by arranging the data lines that control the same color as each other to be adjacent to each other, and arranging the data lines that control different colors from each other relatively farther apart.

However, the present disclosure is not limited to the above aspects and features, and the above and additional aspects and features will be set forth, in part, in the detailed description that follows with reference to the drawings, and in part, may be apparent therefrom, or may be learned by practicing one or more of the presented embodiments of the present disclosure.

BRIEF DESCRIPTION OF THE DRAWINGS

The above and other aspects and features of the present disclosure will be more clearly understood from the following detailed description of the illustrative, non-limiting embodiments with reference to the accompanying drawings.

DETAILED DESCRIPTION

Figure 1:
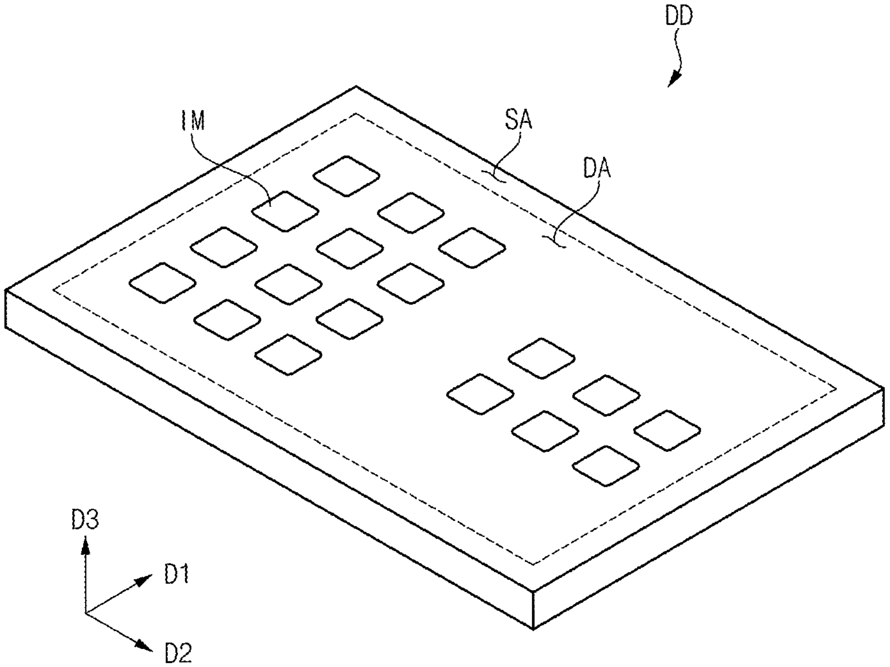
FIG. 1 is a perspective view illustrating a display device according to an embodiment of the present disclosure.

Hereinafter, embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, redundant description thereof may not be repeated.

When a certain embodiment may be implemented differently, a specific process order may be different from the described order. For example, two consecutively described processes may be performed at the same or substantially at the same time, or may be performed in an order opposite to the described order.

Further, as would be understood by a person having ordinary skill in the art, in view of the present disclosure in its entirety, each suitable feature of the various embodiments of the present disclosure may be combined or combined with each other, partially or entirely, and may be technically interlocked and operated in various suitable ways, and each embodiment may be implemented independently of each other or in conjunction with each other in any suitable manner, unless otherwise stated or implied.

In the drawings, the relative sizes, thicknesses, and ratios of elements, layers, and regions may be exaggerated and/or simplified for clarity. Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

Further, it should be expected that the shapes shown in the figures may vary in practice depending, for example, on tolerances and/or manufacturing techniques. Accordingly, the embodiments of the present disclosure should not be construed as being limited to the specific shapes shown in the figures, and should be construed considering changes in shapes that may occur, for example, as a result of manufacturing. As such, the shapes shown in the drawings may not depict the actual shapes of areas of the device, and the present disclosure is not limited thereto.

In the figures, the x-axis, the y-axis, and the z-axis are not limited to three axes of the rectangular coordinate system, and may be interpreted in a broader sense. For example, the x-axis, the y-axis, and the z-axis may be perpendicular to or substantially perpendicular to one another, or may represent different directions from each other that are not perpendicular to one another.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "on," "connected to," or "coupled to" another element or layer, it can be directly on, connected to, or coupled to the other element or layer, or one or more intervening elements or layers may be present. Similarly, when a layer, an area, or an element is referred to as being "electrically connected" to another layer, area, or element, it may be directly electrically connected to the other layer, area, or element, and/or may be indirectly electrically connected with one or more intervening layers, areas, or elements therebetween. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, the expression "A and/or B" denotes A, B, or A and B. Expressions such as "at least one of," when preceding a list of elements, modify the entire list of elements and do not modify the individual elements of the list. For example, the expression "at least one of a, b, or c," "at least one of a, b, and c," and "at least one selected from the group consisting of a, b, and c" indicates only a, only b, only c, both a and b, both a and c, both b and c, all of a, b, and c, or variations thereof.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Hereinafter with reference to the drawings, a plane may be defined by a first direction D1, and a second direction D2 that crosses or intersects the first direction D1. For example, the second direction D2 may be perpendicular to or substantially perpendicular to the first direction D1. In addition, a third direction D3 may be a normal direction of the plane. In other words, the third direction D3 may be perpendicular to or substantially perpendicular to the plane formed by the first direction D1 and the second direction D2.

FIG. 1 is a perspective view illustrating a display device according to an embodiment of the present disclosure.

Referring to FIG. 1, a display device DD may include a display area DA and a peripheral area SA. The display area DA may be surrounded (e.g., around a periphery thereof) by the peripheral area SA.

The display area DA may be an area that may display an image by generating light, or adjusting a transmittance of light provided from an external light source. The peripheral area SA may be an area that does not display an image. However, the present disclosure is not limited thereto, and at least a portion of the peripheral area SA may display an image.

The display area DA may display a plurality of images IM. Users may receive information from the display device DD through the plurality of images IM.

Figure 2:
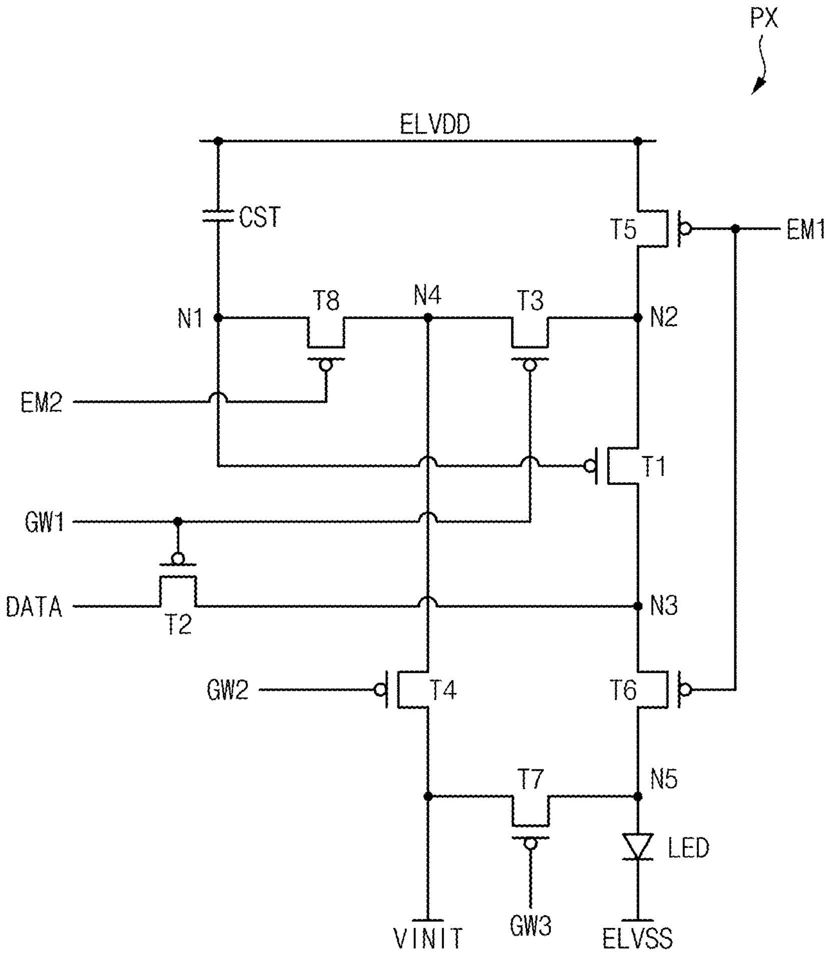
FIG. 2 is a view illustrating an example of a pixel included in the display device of FIG. 1.

FIG. 2 is a view illustrating an example of a pixel included in the display device of FIG. 1.

Referring to FIG. 2, a pixel PX included in the display device DD may include a first transistor T1, a second transistor T2, a third transistor T3, a fourth transistor T4, a fifth a transistor T5, a sixth transistor T6, a seventh transistor T7, an eighth transistor T8, a capacitor CST, and a light emitting diode LED.

The first transistor T1 may include a gate electrode, a first electrode, and a second electrode. The gate electrode of the first transistor T1 may be connected to a first electrode of the eighth transistor T8. The first electrode of the first transistor T1 may be connected to a second electrode of the third transistor T3. The second electrode of the first transistor T1 may be connected to a first electrode of the sixth transistor T6.

The first transistor T1 may generate a driving current in response to a data voltage DATA. To control the driving current, the first transistor T1 may be connected between a second node N2 and a third node N3, and the gate electrode of the first transistor T1 may be connected to the first node N1. The first transistor T1 may generate the driving current in response to the data voltage DATA stored in the capacitor CST. When the fifth transistor T5 and the sixth transistor T6 are turned on, the first transistor T1 may provide the driving current to the light emitting diode LED.

The second transistor T2 may include a gate electrode, a first electrode, and a second electrode. A first gate signal GW1 may be applied to the gate electrode of the second transistor T2. The data voltage DATA may be applied to the first electrode of the second transistor T2. The second electrode of the second transistor T2 may be connected to the third node N3.

The second transistor T2 may provide the data voltage DATA to the third node N3 in response to the first gate signal GW1. When the second transistor T2 is turned on, the data voltage DATA may be provided to the third node N3.

The third transistor T3 may include a gate electrode, a first electrode, and a second electrode. The first gate signal GW1 may be applied to the gate electrode of the third transistor T3. The first electrode of the third transistor T3 may be connected to a second electrode of the eighth transistor T8 at a fourth node N4. The second electrode of the third transistor T3 may be connected to a second electrode of the fifth transistor T5.

The third transistor T3 may provide a voltage of the second node N2 to the fourth node N4 in response to the first gate signal GW1. The third transistor T3 may be connected between the second node N2 and the fourth node N4.

The fourth transistor T4 may include a gate electrode, a first electrode, and a second electrode. A second gate signal GW2 may be applied to the gate electrode of the fourth transistor T4. The first electrode of the fourth transistor T4 may be connected to the fourth node N4. An initialization voltage VINIT may be applied to the second electrode of the fourth transistor T4.

The fourth transistor T4 may provide the initialization voltage VINIT to the fourth node N4 in response to the second gate signal GW2. When the fourth transistor T4 is turned on, the fourth node N4 may be initialized to the initialization voltage VINIT.

The fifth transistor T5 may include a gate electrode, a first electrode, and a second electrode. A first emission control signal EM1 may be applied to the gate electrode of the fifth transistor T5. A first power voltage ELVDD may be applied to the first electrode of the fifth transistor T5. The second electrode of the fifth transistor T5 may be connected to the second node N2.

The fifth transistor T5 may provide the first power voltage ELVDD to the second node N2 in response to the first emission control signal EM1. When the fifth transistor T5 is turned on, the first power voltage ELVDD may be provided to the second node N2.

The sixth transistor T6 may include a gate electrode, a first electrode, and a second electrode. The first emission control signal EM1 may be applied to the gate electrode of the sixth transistor T6. The first electrode of the sixth transistor T6 may be connected to the third node N3. The second electrode of the sixth transistor T6 may be connected to the fifth node N5.

The sixth transistor T6 may provide a voltage of the third node N3 to the fifth node N5 in response to the first emission control signal EM1. The sixth transistor T6 may be connected between the third node N3 and the fifth node N5. When the sixth transistor T6 is turned on, a voltage of the third node N3 may be provided to the fifth node N5.

The seventh transistor T7 may include a gate electrode, a first electrode, and a second electrode. A third gate signal GW3 may be applied to the gate electrode of the seventh transistor T7. The first electrode of the seventh transistor T7 may be connected to the second electrode of the fourth transistor T4. The second electrode of the seventh transistor T7 may be connected to the second electrode of the sixth transistor T6. The seventh transistor T7 may provide the initialization voltage VINIT to the fifth node N5 in response to the third gate signal GW3.

The eighth transistor T8 may include a gate electrode, a first electrode, and a second electrode. A second emission control signal EM2 may be applied to the gate electrode of the eighth transistor T8. The first electrode of the eighth transistor T8 may be connected to a second electrode of the capacitor CST. The second electrode of the eighth transistor T8 may be connected to the first electrode of the third transistor T3. The eighth transistor T8 may provide a voltage of the fourth node N4 to the first node N1 in response to the second emission control signal EM2.

The capacitor CST may include a first electrode and a second electrode. The first power voltage ELVDD may be applied to the first electrode of the capacitor CST. The second electrode of the capacitor CST may be connected to the first electrode of the eighth transistor T8. The capacitor CST may store the data voltage DATA supplied through the first node N1.

The light emitting diode LED may include the first electrode and the second electrode. The first electrode of the light emitting diode LED may be connected to the second electrode of the sixth transistor T6. A second power voltage ELVSS may be applied to the second electrode of the light emitting diode LED.

In FIG. 2, the pixel PX is illustrated as having an 8T1C (e.g., an 8-transistor-1-capacitor) structure, but the present disclosure is not limited thereto. The pixel PX may be variously modified as needed or desired as would be understood by those having ordinary skill in the art, such as to have a 2T1C structure, a 3T1C structure, a 7T1C structure, or the like.

Figure 3:
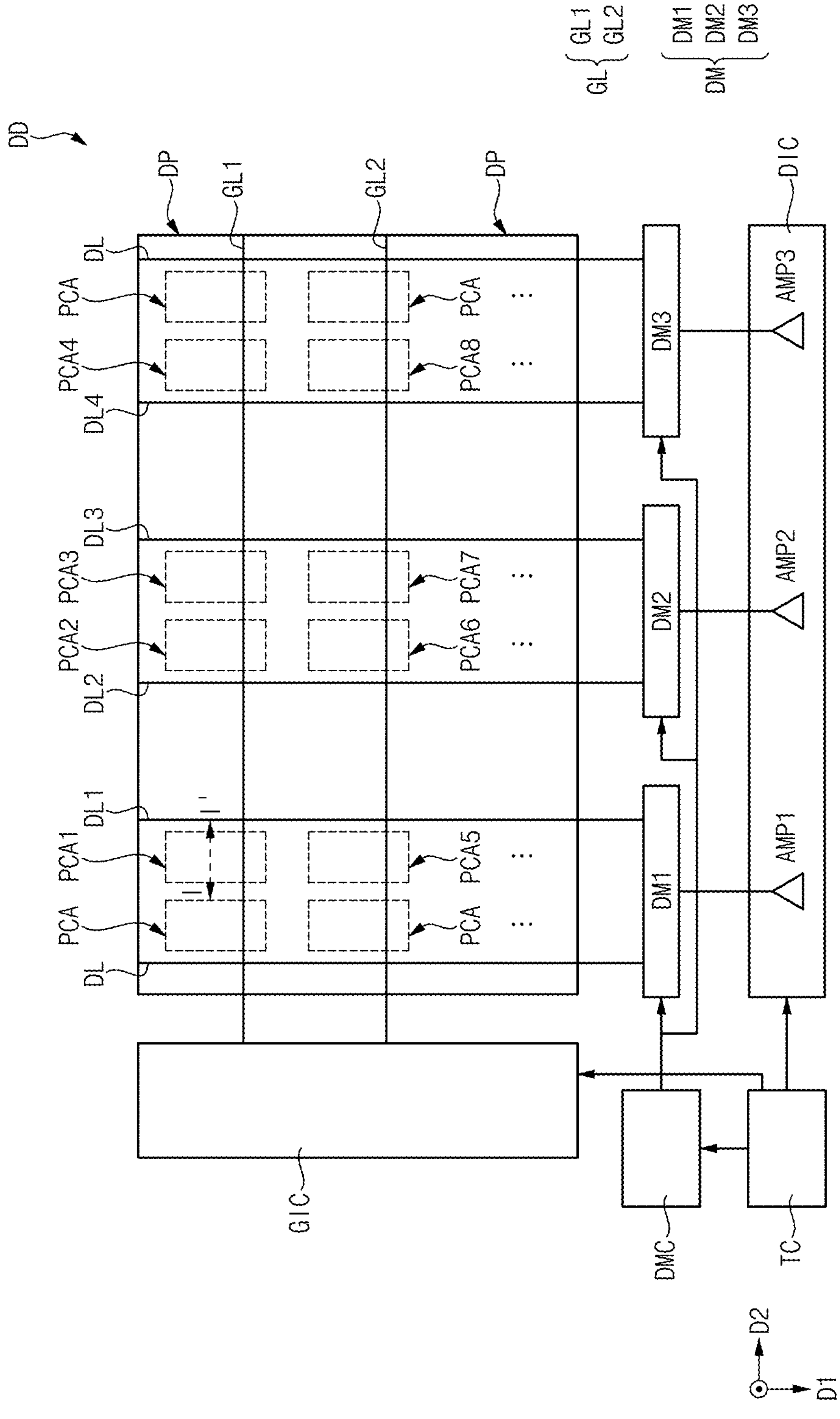
FIG. 3 is a block diagram illustrating the display device of FIG. 1 according to an embodiment of the present disclosure.
Figure 4:
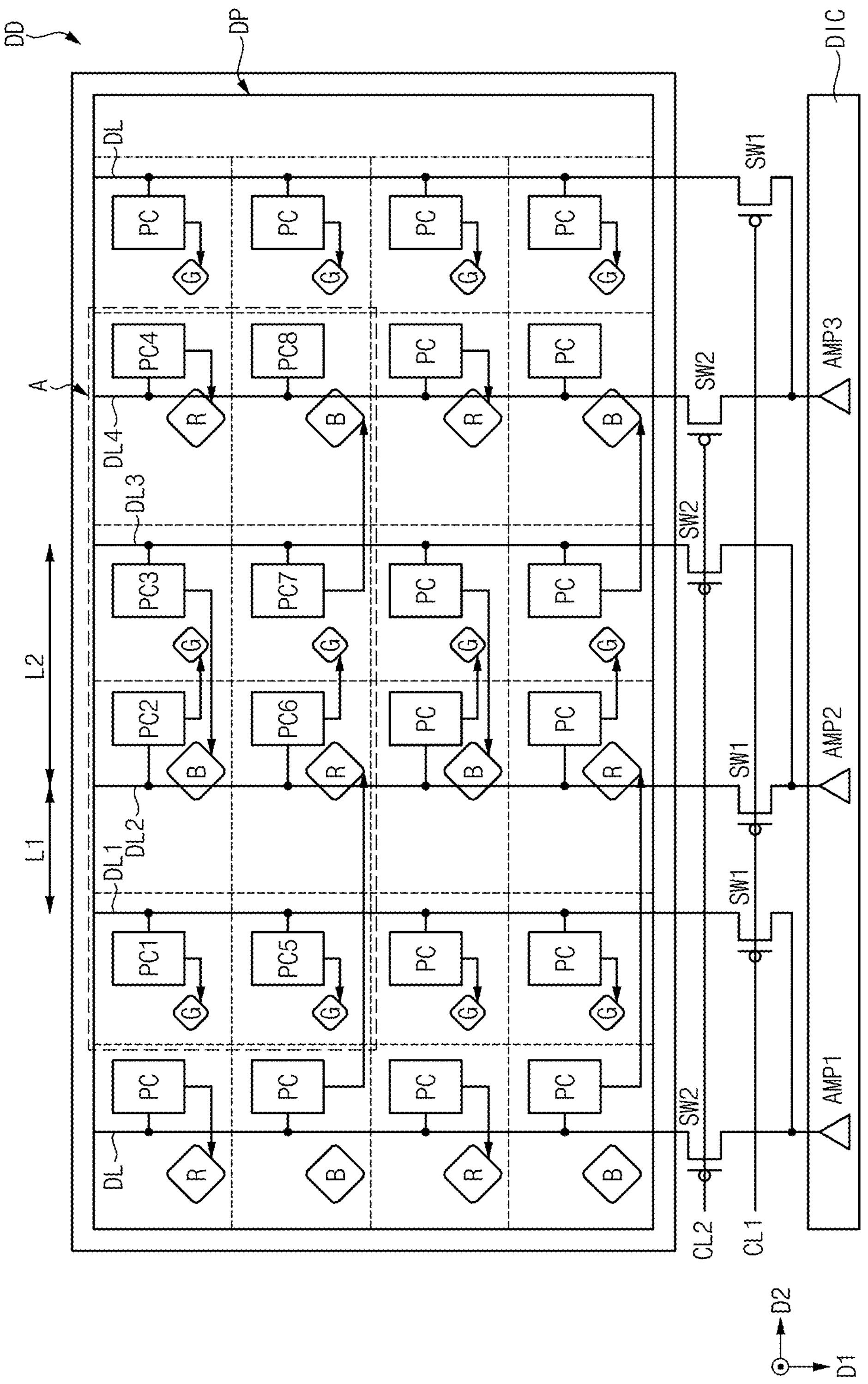
FIG. 4 is a plan view illustrating a light emitting diode disposed in the display device of FIG. 3 according to an embodiment of the present disclosure.

FIG. 3 is a block diagram illustrating the display device of FIG. 1 according to an embodiment of the present disclosure. FIG. 4 is a plan view illustrating a light emitting diode disposed in the display device of FIG. 3 according to an embodiment of the present disclosure.

Referring to FIGS. 1, 2, 3, and 4, the display device DD may include a gate driver GIC, a data driver DIC, a control portion (e.g., a controller) TC, a display panel DP, demultiplexers DM, and a demultiplexer control portion (e.g., a demultiplexer controller) DMC.

The gate driver GIC may generate a gate signal in response to a gate control signal provided from the control portion TC, and may sequentially supply the gate signal to the gate lines GL. The gate lines GL may be electrically connected to the pixels PX, and may turn the pixels PX on and/or off.

The gate lines GL may be disposed on the display panel DP. The gate lines GL may extend from the gate driver GIC in the second direction D2. The gate lines GL may be disposed to be spaced apart from each other in the first direction D1. For example, the gate lines GL may include a first gate line GL1 and a second gate line GL2 along the first direction D1.

The data driver DIC may supply a data signal to the data lines DL in response to a data control signal provided from the control portion TC. The data lines DL may be electrically connected to the pixels PX, and may drive the pixels PX.

The data driver DIC may include first, second, and third amplifiers AMP1, AMP2, and AMP3. Each of the first, second, and third amplifiers AMP1, AMP2, and AMP3 may apply a data signal to the corresponding data lines DL.

The data lines DL may be disposed on the display panel DP. The data lines DL may extend from the data driver DIC in the first direction D1. The data lines DL may be disposed to be spaced apart from each other in the second direction D2. For example, the data lines DL may include a first data line DL1, a second data line DL2, a third data line DL3, and a fourth data line D4 along the second direction D2.

A plurality of pixel circuit areas PCA may be defined in the display panel DP along the first direction D1 and/or the second direction D2. In other words, the pixel circuit areas PCA may be defined in the display panel DP in a mattress shape. Pixel circuit portions PC may be disposed in each of the pixel circuit areas PCA.

In an embodiment, the pixel circuit areas PCA may include first, second, third, fourth, fifth, sixth, seventh, and eighth pixel circuit areas PCA1, PCA2, PCA3, PCA4, PCA5, PCA6, PCA7, and PCA8. The first, second, third, and fourth pixel circuit areas PCA1, PCA2, PCA3, and PCA4 may be disposed on the display panel DP along the second direction D2. The fifth, sixth, seventh, and eighth pixel circuit areas PCA5, PCA6, PCA7, and PCA8 may be disposed on the display panel DP along the second direction D2, may be spaced apart from the first, second, third, and fourth pixel circuit areas PCA1, PCA2, PCA3, and PCA4 in the first direction D1, respectively.

In an embodiment, the first, second, third, and fourth pixel circuit parts PC1, PC2, PC3, and PC4 may be disposed in the first, second, third, and fourth pixel circuit areas PCA1, PCA2, PCA3, and PCA4, respectively. Each of the first, second, third, and fourth pixel circuit portions PC1, PC2, PC3, and PC4 may be electrically connected to the first gate line GL1. In other words, the first gate line GL1 may apply a gate signal to the first, second, third, and fourth pixel circuit portions PC1, PC2, PC3, and PC4.

The fifth, sixth, seventh, and eighth pixel circuit parts PC5, PC6, PC7, and PC8 may be disposed in the fifth, sixth, seventh, and eighth pixel circuit areas PCA5, PCA6, PCA7, and PCA8, respectively. Each of the fifth, sixth, seventh, and eighth pixel circuit portions PC5, PC6, PC7, and PC8 may be electrically connected to the second gate line GL2 disposed to be spaced apart from the first gate line GL1 in the first direction D1. In other words, the second gate line GL2 may apply the gate signal to the fifth, sixth, seventh, and eighth pixel circuit parts PC5, PC6, PC7, and PC8.

In an embodiment, the first pixel circuit portion PC1 and the fifth pixel circuit portion PC5 may be electrically connected to the first data line DL1. The second pixel circuit portion PC2 and the sixth pixel circuit portion PC6 may be electrically connected to the second data line DL2 disposed to be spaced apart from the first data line DL1. The third pixel circuit portion PC3 and the seventh pixel circuit portion PC7 may be electrically connected to the third data line DL3 disposed to be spaced apart from the second data line DL2 in the second direction D2. The fourth pixel circuit portion PC4 and the eighth pixel circuit portion PC8 may be electrically connected to the fourth data line DL4 disposed to be spaced apart from the third data line DL3 in the second direction D2.

In an embodiment, as shown in FIG. 4, the first data line DL1 and the second data line DL2 may be disposed to be spaced apart from each other by a first length L1 in the second direction D2. The second data line DL2 and the third data line DL3 may be disposed to be spaced apart from each other by a second length L2 that is greater than the first length L1 in the second direction D2. The third data line DL3 and the fourth data line DL4 may be disposed to be spaced apart from each other by a distance that is equal to or substantially equal to the first length L1 in the second direction D2.

In an embodiment, pixel circuit portions PC may not be disposed between the first data line DL1 and the second data line DL2 in a plan view. On the other hand, at least one of the pixel circuit portions PC may be disposed between the second data line DL2 and the third data line DL3 in a plan view. For example, the second pixel circuit portion PC2 and the third pixel circuit portion PC3 may be disposed between the second data line DL2 and the third data line DL3.

Figure 5:
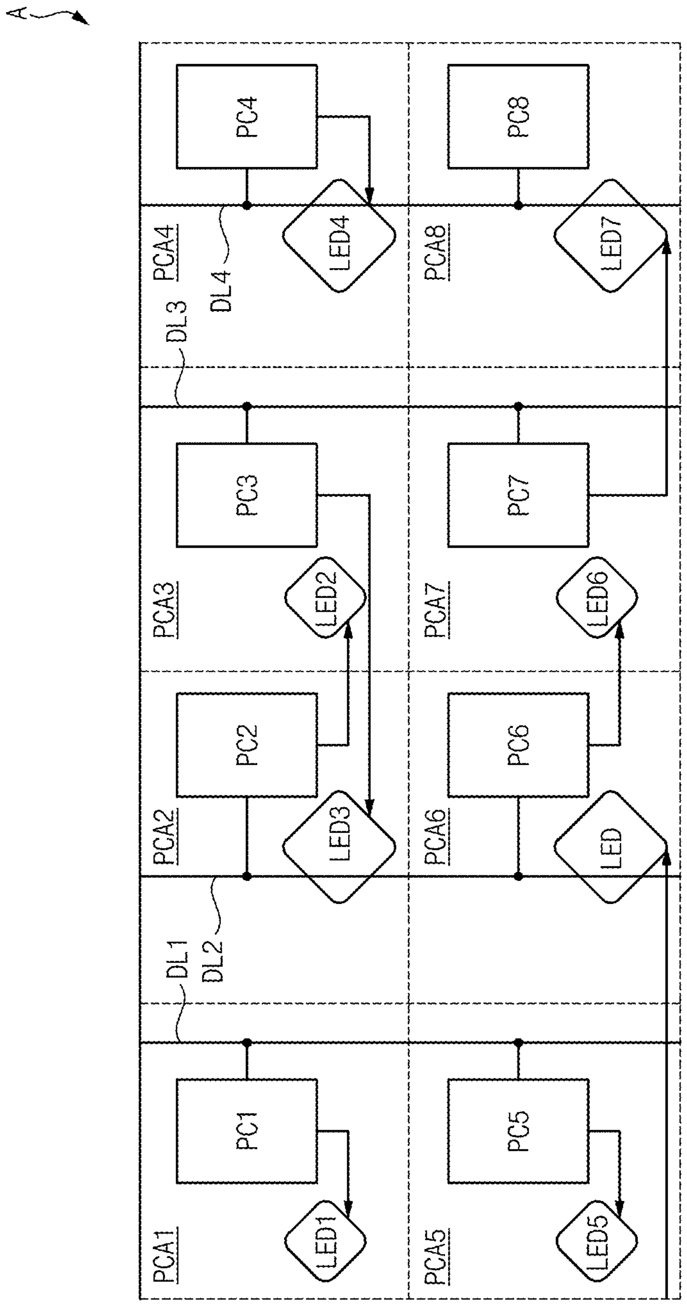
FIG. 5 is an enlarged view of the portion A of FIG. 4.

In an embodiment, each of the first, second, third, fourth, fifth, sixth, seventh, and eighth pixel circuit portions PC1, PC2, PC3, PC4, PC5, PC6, PC7, and PC8 may be electrically connected to a corresponding light emitting diode (e.g., such as the light emitting diode LED in FIG. 5). The light emitting diode LED will be described in more detail below with reference to FIGS. 5 and 6.

The demultiplexers DM may include a first demultiplexer DM1, a second demultiplexer DM2, and a third demultiplexer DM3. The first, second, and third demultiplexers DM1, DM2, and DM3 may be disposed between the display panel DP and the data driver DIC in a plan view. For example, the first, second, and third demultiplexers DM1, DM2, and DM3 may be disposed between the display panel DP and the data driver DIC, and may be disposed side by side with one another in the second direction D2. Signals transmitted from each of the first, second, and third amplifiers AMP1, AMP2, and AMP3 may be branched and applied to two data lines by the demultiplexers DM. For example, the second demultiplexer DM2 may receive a data signal from the second amplifier AMP2, and may alternately transmit the data signal to the second and third data lines DL2 and DL3.

In an embodiment, the first demultiplexer DM1 may be connected to the first amplifier AMP1, and may be electrically connected to the first data line DL1. The second demultiplexer DM2 may be connected to the second amplifier AMP2, and may be electrically connected to the second data line DL2 and the third data line DL3. The third demultiplexer DM3 may be connected to the third amplifier AMP3, and may be electrically connected to the fourth data line DL4.

The demultiplexer control portion DMC may control the first, second, and third demultiplexers DM1, DM2, and DM3. For example, the demultiplexer control portion DMC may control the first, second, and third demultiplexers DM1, DM2, and DM3 through a first clock signal line CL1 and a second clock signal line CL2 that extends from the demultiplexer control portion DMC in the second direction D2, and are disposed to be spaced apart from each other.

In an embodiment, the first clock signal line CL1 may be electrically connected to the first data line DL1 and the second data line DL2. In other words, the first clock signal line CL1 may control the first data line DL1 and the second data line DL2 through first switches SW1. The second clock signal line CL2 may be electrically connected to the third data line DL3 and the fourth data line DL4. In other words, the second clock signal line CL2 may control the third data line DL3 and the fourth data line DL4 through second switches SW2.

Figure 6:
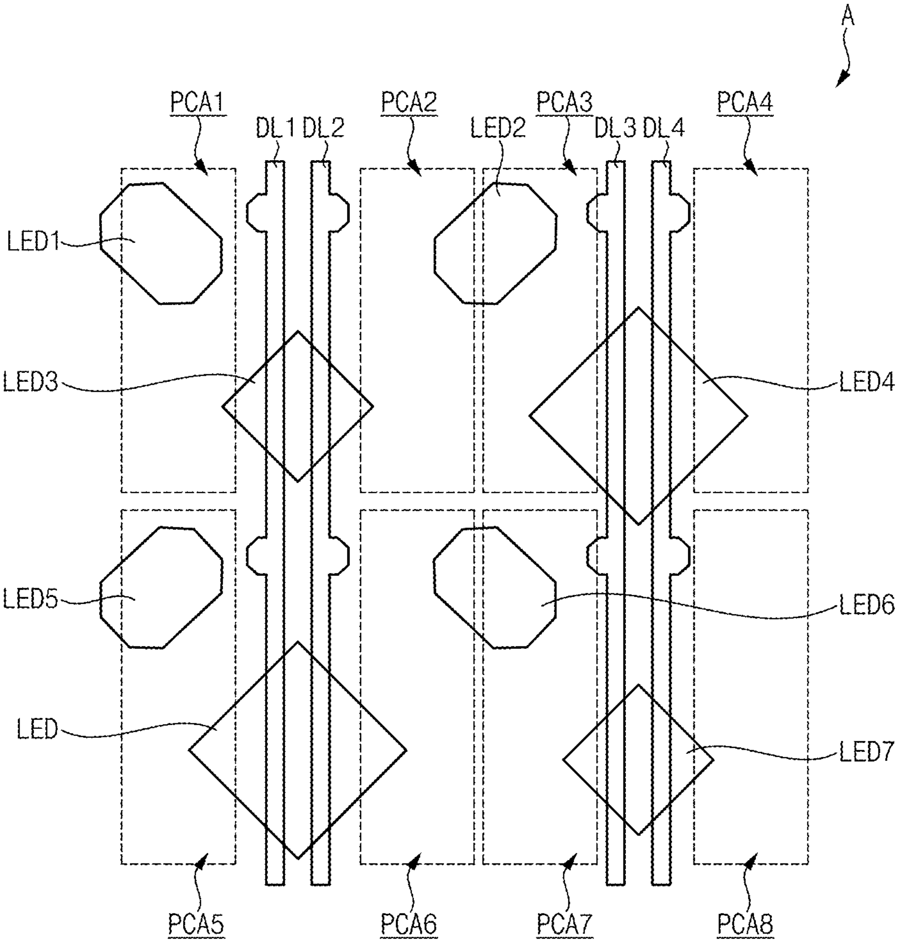
FIG. 6 is a plan view illustrating a layout of the view of FIG. 5.

FIG. 5 is an enlarged view of the portion A of FIG. 4. FIG. 6 is a plan view illustrating a layout of the view of FIG. 5. In other words, FIG. 5 shows (e.g., only shows) a schematic arrangement of the components disposed in the display device DD, and does not show the actual shapes thereof.

Referring to FIGS. 3, 4, 5, and 6, the light emitting diode LED may include first, second, third, fourth, fifth, sixth, and seventh light emitting diodes LED1, LED2, LED3, LED4, LED5, LED6, and LED7. The first, second, third, fourth, fifth, sixth, and seventh light emitting diodes LED1, LED2, LED3, LED4, LED5, LED6, and LED7 may be disposed on the display panel DP. For example, the first, second, third, fourth, fifth, sixth, and seventh light emitting diodes LED1, LED2, LED3, LED4, LED5, LED6, and LED7 may be disposed along the first direction D1 and/or the second direction D2.

The first, second, third, fourth, fifth, sixth, and seventh light emitting diodes LED1, LED2, LED3, LED4, LED5, LED6, and LED7 may be connected to the first, second, third, fourth, fifth, sixth, and seventh pixel circuit portions PC1, PC2, PC3, PC4, PC5, PC6, and PC7, respectively. In other words, the first, second, third, fourth, fifth, sixth, and seventh pixel circuit portions PC1, PC2, PC3, PC4, PC5, PC6, and PC7 may drive the first, second, third, fourth, fifth, sixth, and seventh light emitting diodes LED1, LED2, LED3, LED4, LED5, LED6, and LED7, respectively.

In an embodiment, the first light emitting diode LED1 may overlap with at least a portion of the first pixel circuit area PCA1 in a plan view. The second light emitting diode LED2 may overlap with at least a portion of the third pixel circuit area PCA3 in a plan view. The third light emitting diode LED3 may overlap with at least a portion of the second pixel circuit area PCA2 in a plan view. The fourth light emitting diode LED4 may overlap with at least a portion of the fourth pixel circuit area PCA4 in a plan view. The fifth light emitting diode LED5 may overlap with at least a portion of the fifth pixel circuit area PCA5 in a plan view. The sixth light emitting diode LED6 may overlap with at least a portion of the seventh pixel circuit area PCA7 in a plan view. The seventh light emitting diode LED7 may overlap with at least a portion of the eighth pixel circuit area PCA8 in a plan view.

In an embodiment, as shown in FIG. 6, the third light emitting diode LED3 may overlap with the first data line DL1 and the second data line DL2 in a plan view. Each of the fourth light emitting diode LED4 and the seventh light emitting diode LED7 may overlap with the third data line DL3 and the fourth data line DL4 in a plan view. The first light emitting diode LED1, the second light emitting diode LED2, the fifth light emitting diode LED5, and the sixth light emitting diode LED6 may not overlap with the data lines DL in a plan view. However, the present disclosure is not limited thereto.

In an embodiment, the first light emitting diode LED1 and the fifth light emitting diode LED5 may emit light of a same color as each other. The second light emitting diode LED2 and the sixth light emitting diode LED6 may emit light of a same color as each other. The third light emitting diode LED3 and the seventh light emitting diode LED7 may emit light of a same color as each other.

For example, the first light emitting diode LED1 and the fifth light emitting diode LED5 may emit light of a first color. The second light emitting diode LED2 and the sixth light emitting diode LED6 may emit light of the first color. In other words, the first light emitting diode LED1, the second light emitting diode LED2, the fifth light emitting diode LED5, and the sixth light emitting diode LED6 may emit light of the same color as each other. The third light emitting diode LED3 and the seventh light emitting diode LED7 may emit light of a second color. The fourth light emitting diode LED4 may emit light of a third color.

For example, the first color may be a green color, the second color may be a blue color, and the third color may be a red color. For another example, the first color may be a green color, the second color may be a red color, and the third color may be a blue color. However, the present disclosure is not limited thereto.

According to some embodiments of the present disclosure, a power consumption of the first amplifier AMP1 that controls the first data line DL1 may be reduced as the first light emitting diode LED1 and the fifth light emitting diode LED5 emitting light of the first color are concurrently or simultaneously connected to the first data line DL1. In other words, when compared to a case in which the first amplifier AMP1 applies two or more color signals to the first data line DL1, a power consumption of the first amplifier AMP1 may be reduced when controlling one color signal according to some embodiments.

Similarly, a power consumption of the second amplifier AMP2 may be reduced as the second light emitting diode LED2 and the sixth light emitting diode LED6 that emit light of the first color are concurrently or simultaneously connected to the second data line DL2.

In addition, as the first data line DL1 and the second data line DL2 control the same first color, a data coupling between the first data line DL1 and the second data line DL2 may be reduced. In other words, the data coupling between the data lines DL may be reduced through disposing the data lines DL that control the same color as each other are placed adjacent to each other, and the data lines DL that control different colors from each other are placed relatively farther apart from each other.

As a result, by arranging the first, second, third, fourth, fifth, sixth, seventh, and eighth pixel circuit portions PC1, PC2, PC3, PC4, PC5, PC6, PC7, and PC8 and the first, second, third, and fourth data lines DL1, DL2, DL3, and DL4 as described above with reference to FIG. 5, a power consumption and a data coupling of the display device DD may be prevented or reduced. Accordingly, the display device DD having an improved display quality may be provided.

In an embodiment, the light emitting diode LED may have a diamond shape in a plan view. However, the present disclosure is not limited thereto. Each of the light emitting diodes LED may have a circular shape, an elliptical shape, or a polygonal shape.

Figure 7:
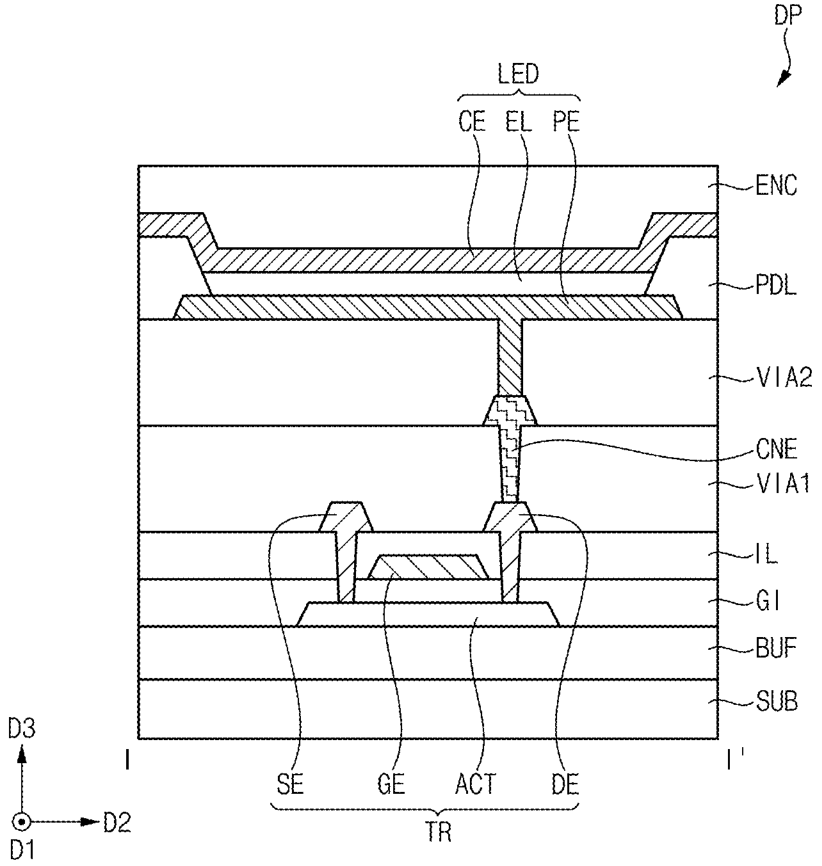
FIG. 7 is a cross-sectional view taken along the line I-I' of FIG. 3.

FIG. 7 is a cross-sectional view taken along the line I-I' of FIG. 3.

Referring to FIGS. 3 and 7, the display panel DP may include a substrate SUB, a buffer layer BUF, a gate insulating layer GI, a transistor TR, an interlayer insulating layer IL, a connecting electrode CNE, a first via layer VIA1, a second via layer VIA2, a light emitting diode LED, a pixel defining layer PDL, and an encapsulation layer ENC.

The transistor TR may include an active layer ACT, a gate electrode GE, a source electrode SE, and a drain electrode DE. The light emitting diode LED may include a pixel electrode PE, a light emitting layer EL, and a common electrode CE.

The substrate SUB may include a glass substrate, a metal substrate, a plastic substrate, or the like. However, the present disclosure is not limited thereto, and the substrate SUB may be an inorganic layer, an organic layer, or a composite material layer.

The buffer layer BUF may be disposed on the substrate SUB. The buffer layer BUF may prevent or substantially prevent impurities, such as oxygen and moisture, from penetrating into an upper part of the substrate SUB. The buffer layer BUF may include an inorganic insulating material.

The active layer ACT may be disposed on the buffer layer BUF. The active layer ACT may include an oxide semiconductor, a silicon semiconductor, an organic semiconductor, or the like. For example, the oxide semiconductor may include at least one oxide from among indium (In), gallium (Ga), tin (Sn), zirconium (Zr), vanadium (V), hafnium (Hf), cadmium (Cd), germanium (GE), chromium (Cr), titanium (Ti), and/or zinc (Zn). The silicon semiconductor may include amorphous silicon, polycrystalline silicon, or the like. The active layer ACT may include a source region, a drain region, and a channel region disposed between the source region and the drain region.

The gate insulating layer GI may be disposed on the buffer layer BUF. In more detail, the gate insulating layer GI may cover the active layer ACT on the buffer layer BUF. The gate insulating layer GI may include an inorganic insulating material. In an embodiment, the gate insulating layer GI may be formed entirely in the display area DA and the peripheral area SA.

The gate electrode GE may be disposed on the gate insulating layer GI. The gate electrode GE may at least partially overlap with the channel region of the active layer ACT. The gate electrode GE may include a conductive material, such as a metal, an alloy, a conductive metal nitride, a conductive metal oxide, or a transparent conductive material. Examples of the conductive material that may be used in the gate electrode GE may include gold (Au), silver (Ag), aluminum (AI), platinum (PT), nickel (Ni), titanium (Ti), palladium (Pd), magnesium (Mg), calcium (Ca), lithium (Li), chromium (Cr), tantalum (Ta), tungsten (W), copper (Cu), molybdenum (Mo), scandium (Sc), neodymium (Nd), iridium (Ir), an alloy containing aluminum, an alloy containing silver, an alloy containing copper, an alloy containing molybdenum, aluminum nitride (AlN), tungsten nitride (WN), titanium nitride (TiN), chromium nitride (CrN), tantalum nitride (TaN), strontium ruthenium oxide (SrRuO), zinc oxide (ZnO), indium tin oxide (ITO), tin oxide (SnO), indium oxide (InO), gallium oxide (GaO), indium zinc oxide (IZO), and/or the like. These materials may be used alone or in various suitable combinations with each other. As another example, the gate electrode GE may have a single-layer structure, or a multi-layered structure including a plurality of conductive layers.

The interlayer insulating layer IL may be disposed on the gate electrode GE. In more detail, the interlayer insulating layer IL may be disposed on the gate insulating layer GI, and may cover the gate electrode GE on the gate insulating layer GI. The interlayer insulating layer IL may include an inorganic insulating material.

The source electrode SE and the drain electrode DE may be disposed on the interlayer insulating layer IL. Each of the source electrode SE and the drain electrode DE may be connected to the active layer ACT. For example, the source electrode SE may contact the source region of the active layer ACT, and the drain electrode DE may contact the drain region of the active layer ACT. Each of the source electrode SE and the drain electrode DE may include a conductive material. The active layer ACT, the gate electrode GE, the source electrode SE, and the drain electrode DE may form the transistor TR.

The first via layer VIA1 may be disposed on the source electrode SE and the drain electrode DE. The first via layer VIA1 may be disposed on the interlayer insulating layer IL, and may cover the source electrode SE and the drain electrode DE on the interlayer insulating layer IL. The first via layer VIA1 may include an organic insulating material. In an embodiment, the first via layer VIA1 may be formed in (e.g., only in) the display area DA and a portion of the peripheral area SA adjacent to the display area DA.

The connection electrode CNE may be disposed on the first via layer VIA1. The connection electrode CNE may transmit a signal transmitted from the transistor TR to the light emitting diode LED. The connection electrode CNE may include a metal, an alloy, a metal nitride, a conductive metal oxide, a transparent conductive material, or the like. These materials may be used alone or in various suitable combinations with each other. However, the present disclosure is not limited thereto.

The second via layer VIA2 may be disposed on the connection electrode CNE. The second via layer VIA2 may be disposed on the first via layer VIA1, and may cover the connection electrode CNE. The second via layer VIA2 may include the same or substantially a same material as that of the first via layer VIA1.

The pixel electrode PE may be disposed on the second via layer VIA2. The pixel electrode PE may include a conductive material. The pixel electrode PE may be connected to the drain electrode DE through the connection electrode CNE.

Accordingly, the pixel electrode PE may be electrically connected to the transistor TR.

The pixel defining layer PDL may be disposed on the pixel electrode PE. For example, the pixel defining layer PDL may expose at least a portion of the pixel electrode PE. The pixel defining layer PDL may include an inorganic insulating material or an organic insulating material.

The light emitting layer EL may be disposed on the pixel electrode PE. The light emitting layer EL may be disposed within an opening defined by the pixel defining layer PDL. In other words, the light emitting layer EL may be surrounded (e.g., around a periphery thereof) by the pixel defining layer PDL. The light emitting layer EL may include at least one of an organic light emitting material and/or quantum dots. However, the present disclosure is not limited thereto.

The common electrode CE may be disposed on the light emitting layer EL. The common electrode CE may also be disposed on the pixel defining layer PDL. In other words, the common electrode CE may be continuously disposed on the light emitting layer EL and the pixel defining layer PDL. The common electrode CE may include a conductive material. The light emitting layer EL may emit light based on voltage difference between the pixel electrode PE and the common electrode CE.

The encapsulation layer ENC may be disposed on the common electrode CE. The encapsulation layer ENC may include at least one inorganic encapsulation layer and at least one organic encapsulation layer. In an embodiment, the inorganic encapsulation layer and the organic encapsulation layer may be alternately disposed. For example, the organic encapsulation layer may include a cured polymer, such as polyacrylate, an epoxy resin, or a silicone resin. For example, the inorganic encapsulation layer may include silicon oxide, silicon nitride, silicon carbide, aluminum oxide, tantalum oxide, hafnium oxide, zirconium oxide, titanium oxide, or the like.

Figure 8:
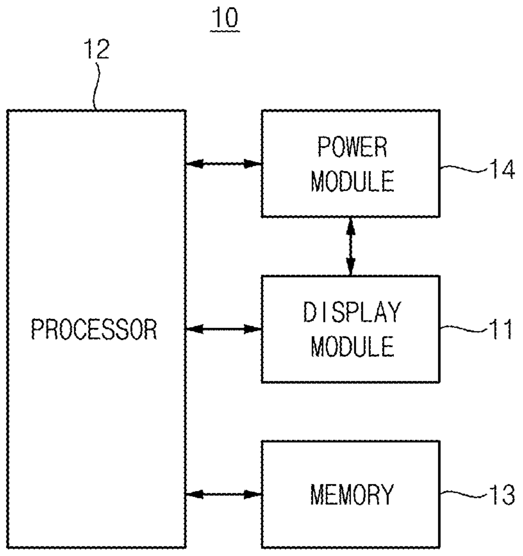
FIG. 8 is a block-diagram showing an electronic device according to an embodiment of the present disclosure.

FIG. 8 is a block-diagram showing an electronic device according to an embodiment of the present disclosure.

Referring to FIG. 1 and FIG. 8, the display device DD according to the embodiments may be applied to various electronic devices 10. The electronic device 10 according to an embodiment may include the display device DD, and may further include a module or device including additional functions in addition to the display device DD.

The electronic device 10 may include a display module 11, a processor 12, a memory 13, and a power module 14.

The processor 12 may include at least one of a central processing unit (CPU), an application processor (AP), a graphic processing unit (GPU), a communication processor (CP), an image signal processor (ISP), and a controller.

The memory 13 may store data information necessary for an operation of the processor 12 or the display module 11. When the processor 12 executes an application stored in the memory 13, an image data signal and/or an input control signal may be transmitted to the display module 11, and the display module 11 may process the received signal and output image information through a display screen.

The power module 14 may include a power supply module such as a power adapter or a battery device, and a power conversion module that converts the power supplied by the power supply module to generate power necessary for an operation of the electronic device 10.

At least one of the components of the electronic device 10 described above may be included in the display device according to the embodiments described above. In addition, some of individual modules functionally included in one module may be included in the display device, and other parts may be provided separately from the display device. For example, the display device DD may include the display module 11, and the processor 12, the memory 13, and the power module 14 may be provided in the form of other devices within the electronic device 10 other than the display device DD.

Figure 9:
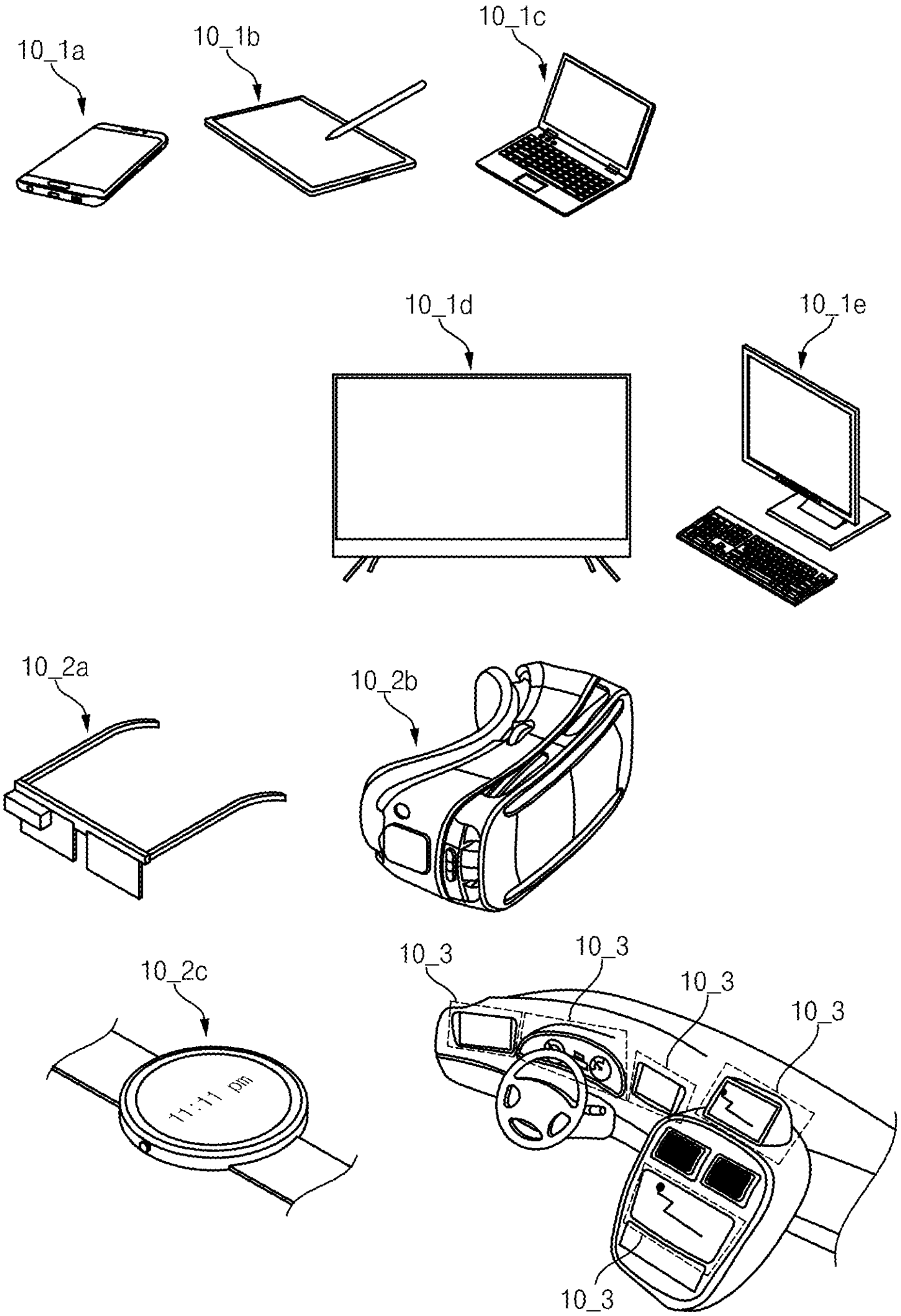
FIG. 9 is a schematic view of an electronic device according to various embodiments of FIG. 8.

FIG. 9 is a schematic view of an electronic device according to various embodiments of FIG. 8.

Referring to FIG. 8 and FIG. 9, various electronic devices to which the display device DD according to embodiments is applied may include not only image display electronic devices such as a smart phone 10_1*a*, a tablet PC 10_1*b*, a laptop 10_1*c*, a TV 10_1*d*, and a desk monitor 10_1*e*, but also wearable electronic devices including display modules such as smart glasses 10_2*a*, a head-mounted display 10_2*b*, and a smart watch 10_2*c*, and vehicle electronic devices 10_3 including display modules such as a CID (center information display) and a room mirror display placed on a dashboard, center fascia, or dashboard of an automobile.

However, this is exemplary, and the electronic device 10 according to embodiments of the present disclosure is not limited thereto. For example, the electronic device 10 may be implemented as a mobile phone, a video phone, a smart pad, a smart watch, a tablet PC, a vehicle display, a computer monitor, a notebook computer, a head-mounted display device, etc. In addition, the electronic device 10 may be a television, a monitor, a notebook computer, or a tablet. In addition, the electronic device 10 may be an automobile.

Embodiments of the present disclosure described above may be applied to the display device, and the electronic device including the display device. For example, embodiments of the present disclosure may be applied to high-resolution smartphones, mobile phones, smart pads, smart watches, tablet PCs, vehicle navigation systems, televisions, computer monitors, laptops, and the like.

The electronic or electric devices and/or any other relevant devices or components according to embodiments of the present disclosure described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the example embodiments of the present disclosure.

The foregoing is illustrative of some embodiments of the present disclosure, and is not to be construed as limiting thereof. Although some embodiments have been described, those skilled in the art will readily appreciate that various modifications are possible in the embodiments without departing from the spirit and scope of the present disclosure. It will be understood that descriptions of features or aspects within each embodiment should typically be considered as available for other similar features or aspects in other embodiments, unless otherwise described. Thus, as would be apparent to one of ordinary skill in the art, features, characteristics, and/or elements described in connection with a particular embodiment may be used singly or in combination with features, characteristics, and/or elements described in connection with other embodiments unless otherwise specifically indicated. Therefore, it is to be understood that the foregoing is illustrative of various example embodiments and is not to be construed as limited to the specific embodiments disclosed herein, and that various modifications to the disclosed embodiments, as well as other example embodiments, are intended to be included within the spirit and scope of the present disclosure as defined in the appended claims, and their equivalents.

What is claimed is:

1. A display device comprising:

a display panel comprising first, second, third, and fourth data lines, each extending in a first direction, and spaced from each other along a second direction crossing the first direction; and a data driver adjacent to the display panel in the first direction, and comprising first, second, and third amplifiers, wherein the display panel further comprises:

a first pixel circuit portion in a first pixel circuit area, connected to the first data line connected to the first amplifier, and configured to drive a first light emitting diode configured to emit a first color;

a second pixel circuit portion in a second pixel circuit area spaced from the first pixel circuit area in the second direction, connected to the second data line connected to the second amplifier, and configured to drive a second light emitting diode configured to emit the first color;

a third pixel circuit portion in a third pixel circuit area spaced from the second pixel circuit area in the second direction, connected to the third data line connected to the second amplifier, and configured to drive a third light emitting diode configured to emit a second color;

a fourth pixel circuit portion in a fourth pixel circuit area spaced from the third pixel circuit area in the second direction, connected to the fourth data line connected to the third amplifier, and configured to drive a fourth light emitting diode configured to emit a third color;

a fifth pixel circuit portion in a fifth pixel circuit area spaced from the first pixel circuit area in the first direction, connected to the first data line connected to the first amplifier, and configured to drive a fifth light emitting diode configured to emit the first color;

a sixth pixel circuit portion in a sixth pixel circuit area spaced from the second pixel circuit area in the first direction, connected to the second data line connected to the second amplifier, and configured to drive a sixth light emitting diode configured to emit the first color;

a seventh pixel circuit portion in a seventh pixel circuit area spaced from the third pixel circuit area in the first direction, connected to the third data line connected to the second amplifier, and configured to drive a seventh light emitting diode configured to emit the second color; and an eighth pixel circuit portion in an eighth pixel circuit area spaced from the fourth pixel circuit area in the first direction, connected to the fourth data line connected to the third amplifier, and configured to drive an eighth light emitting diode configured to emit the third color.

2. The display device of claim 1, wherein the first light emitting diode overlaps with at least a portion of the first pixel circuit area in a plan view, and wherein the second light emitting diode overlaps with at least a portion of the third pixel circuit area in a plan view.

3. The display device of claim 2, wherein the fifth light emitting diode overlaps with at least a portion of the fifth pixel circuit area in a plan view, and wherein the sixth light emitting diode overlaps with at least a portion of the seventh pixel circuit area in a plan view.

4. The display device of claim 1, wherein the first color is a green color, the second color is a blue color, and the third color is a red color.

5. The display device of claim 1, wherein the first color is a green color, the second color is a red color, and the third color is a blue color.

6. The display device of claim 1, wherein no pixel circuit portion is located between the first data line and the second data line in a plan view, and wherein at least one pixel circuit portion from among the first to eighth pixel circuit portions is located between the second data line and the third data line.

7. The display device of claim 1, wherein the first data line and the second data line are spaced from each other by a first length in the second direction, and wherein the second data line and the third data line are spaced from each other by a second length greater than the first length in the second direction.

8. The display device of claim 1, wherein each of the first, second, third, fourth, fifth, sixth, seventh, and eighth light emitting diodes has a diamond shape in a plan view.

9. The display device of claim 1, further comprising:

demultiplexers between the display panel and the data driver; and a demultiplexer controller configured to drive the demultiplexers.

10. The display device of claim 9, wherein the demultiplexers comprise first, second, and third demultiplexers, wherein the first demultiplexer is electrically connected to the first data line, wherein the second demultiplexer is electrically connected to the second data line and the third data line, and wherein the third demultiplexer is electrically connected to the fourth data line.

11. The display device of claim 9, further comprising:

a first clock signal line and a second clock signal line connected to the demultiplexer controller, and extending in the second direction.

12. The display device of claim 11, wherein the first clock signal line is electrically connected to the first data line and the second data line, and wherein the second clock signal line is electrically connected to the third data line and the fourth data line.

13. The display device of claim 12, wherein the second amplifier is configured to alternately transmit data signals to the second data line and the third data line through the first clock signal line and the second clock signal line.

14. An electronic device including: a display device; and a processor that drives the display device, and wherein the display device includes:

a display panel comprising first, second, third, and fourth data lines, each extending in a first direction, and spaced from each other along a second direction crossing the first direction; and a data driver adjacent to the display panel in the first direction, and comprising first, second, and third amplifiers, wherein the display panel further comprises:

a first pixel circuit portion in a first pixel circuit area, connected to the first data line connected to the first amplifier, and configured to drive a first light emitting diode configured to emit a first color;

a second pixel circuit portion in a second pixel circuit area spaced from the first pixel circuit area in the second direction, connected to the second data line connected to the second amplifier, and configured to drive a second light emitting diode configured to emit the first color;

a third pixel circuit portion in a third pixel circuit area spaced from the second pixel circuit area in the second direction, connected to the third data line connected to the second amplifier, and configured to drive a third light emitting diode configured to emit a second color;

a fourth pixel circuit portion in a fourth pixel circuit area spaced from the third pixel circuit area in the second direction, connected to the fourth data line connected to the third amplifier, and configured to drive a fourth light emitting diode configured to emit a third color;

a fifth pixel circuit portion in a fifth pixel circuit area spaced from the first pixel circuit area in the first direction, connected to the first data line connected to the first amplifier, and configured to drive a fifth light emitting diode configured to emit the first color;

a sixth pixel circuit portion in a sixth pixel circuit area spaced from the second pixel circuit area in the first direction, connected to the second data line connected to the second amplifier, and configured to drive a sixth light emitting diode configured to emit the first color;

a seventh pixel circuit portion in a seventh pixel circuit area spaced from the third pixel circuit area in the first direction, connected to the third data line connected to the second amplifier, and configured to drive a seventh light emitting diode configured to emit the second color; and an eighth pixel circuit portion in an eighth pixel circuit area spaced from the fourth pixel circuit area in the first direction, connected to the fourth data line connected to the third amplifier, and configured to drive an eighth light emitting diode configured to emit the third color.

* * * * *